(12) United States Patent
Christidis (10) Patent No.: US 9,588,734 B2
(45) Date of Patent: Mar. 7, 2017

(54) TRANSLATION LAYER FOR CONTROLLING BUS ACCESS

(71) Applicant: ATI Technologies ULC, East Markham (CA)

(72) Inventor: Kostantinos D. Christidis, Toronto (CA)

(73) Assignee: ATI Technologies ULC, Markham (CA)

( * ) Notice: Subject to any disclaimer, the term of this patent is extended or adjusted under 35 U.S.C. 154(b) by 343 days.

(21) Appl. No.: 14/304,191

(22) Filed: Jun. 13, 2014

(65) Prior Publication Data

US 2015/0363166 A1 Dec. 17, 2015

(51) Int. Cl.
*G06F 5/14* (2006.01)
*G06F 5/06* (2006.01)
*G06F 13/362* (2006.01)
*G06F 13/16* (2006.01)

(52) U.S. Cl.
CPC ............... *G06F 5/14* (2013.01); *G06F 5/065* (2013.01); *G06F 13/1663* (2013.01); *G06F 13/1673* (2013.01); *G06F 13/3625* (2013.01); *G06F 2205/126* (2013.01)

(58) Field of Classification Search
CPC ... G06F 5/12; G06F 5/14; G06F 5/065; G06F 2205/126
USPC .......................................................... 710/57
See application file for complete search history.

(56) References Cited

U.S. PATENT DOCUMENTS

| 4,115,755 A * | 9/1978 | Cotton ................. G05D 1/0066 244/17.13 |
| 4,298,954 A * | 11/1981 | Bigelow .................. G06F 5/16 710/53 |
| 5,418,744 A * | 5/1995 | Taoda .................. G11C 7/1078 365/189.05 |
| 5,884,099 A * | 3/1999 | Klingelhofer ............ G06F 5/10 710/52 |
| 6,157,989 A * | 12/2000 | Collins .................... G06F 13/18 710/116 |
| 8,489,752 B2 | 7/2013 | Kruger et al. |
| 2008/0005401 A1* | 1/2008 | Holley, II ................. G06F 5/10 710/52 |
| 2009/0313323 A1 | 12/2009 | Kruger et al. |
| 2011/0286335 A1* | 11/2011 | Dubey .................... H04L 47/10 370/236 |

OTHER PUBLICATIONS

"AMBA AXI Protocol Version 1.0", ARM Limited, 2003-2004, 108 pages.

* cited by examiner

*Primary Examiner* — Glenn A Auve (57) ABSTRACT

A translation layer includes a plurality of first buffers and a controller to assert one or more ready signals corresponding to one or more of the plurality of first buffers in response to the one or more of the plurality of first buffers being less than full. The one or more of the plurality of first buffers receives data or control information from one or more corresponding components in response to the ready signal being asserted concurrently with one or more valid signals asserted by the one or more corresponding components.

20 Claims, 8 Drawing Sheets

TRANSLATION LAYER FOR CONTROLLING BUS ACCESS

BACKGROUND

Field of the Disclosure

The present disclosure relates generally to processing devices and, more particularly, for controlling access to a bus in a processing device.

Description of the Related Art

The advanced microcontroller bus architecture (AMBA) is an open standard, on-chip interconnect specification for the connection and management of functional blocks in processing devices such as a system-on-a-chip (SOC). For example, an AMBA-compliant interface may be used to connect various components of an SOC to a request bus in the SOC. Access to the request bus is controlled by a valid/ready protocol. A first component may assert a "valid" signal to the interface to indicate that data or control information (such as an address for a read request, an address for a write request, or data for a write request) is available for transfer on a channel of the request bus to a second component. The request bus may assert a "ready" signal to the interface to indicate that the request bus is ready to accept the data or control information. Once the valid signal from the component and the ready signal from the request bus are asserted concurrently, the data or control information is transferred from the first component to the second component over the request bus.

The SOC may also include a response bus for providing responses to the requests transmitted over the request bus such as the data produced by a read request or a confirmation of a successful write request. The response bus may assert a valid signal to indicate that the information is available for transfer on a channel of the response bus and the component may assert a ready signal to indicate that it is ready to accept the information. Once the valid signal and the ready signal are asserted concurrently, the information may be transferred to the component on the response bus.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

The valid/ready protocol implemented in AMBA bus interfaces has a number of drawbacks. For example, an AMBA bus interface does not support daisy-chaining multiple components and therefore the AMBA bus interface may have a large wiring overhead when multiple components are connected to the bus. The AMBA bus interface is also incapable of accounting for relative differences in the propagation times between different components and the bus, which may hamper attempts to schedule access to the bus and may lead to contention problems. Furthermore, arbitration between access requests from different components is not supported by the AMBA protocol.

Existing AMBA protocols can be leveraged to support a bus interface that implements an area-efficient daisy-chain topology and a power-efficient packetized protocol by incorporating a translation layer between AMBA-compliant components and a bus. Some embodiments of the translation layer include buffers (such as FIFO buffers) associated with each of the components to store data or control information for transfer over the bus. Components can indicate that data or control information is available for transfer over the bus by asserting a valid signal. A controller in the translation layer may provide a corresponding ready signal to the component in response to its buffer being less than full. The component transfers the data or control information to the buffer in response to concurrent assertion of the valid and ready signals.

The buffers can transmit a signal (which may be referred to as an ASK command) to the controller to indicate that data or control information is available for transfer to the bus. In response to receiving one or more ASK commands, the controller may selectively transfer data or control information to the bus from one or more entries in the buffers of the different components based on an arbitration scheme. The signal that indicates that data or control information in an entry of the buffer is to be transferred to the bus may be referred to as a GO command. Some embodiments of the controller may determine time intervals required to propagate a GO command to a buffer and to propagate the data or control information from the buffer to the bus. Delay elements in the controller may be configured so that the time interval needed to propagate the GO command to the buffer and return the data or control information to the bus is the same for all buffers within a predetermined tolerance.

Figure 1:
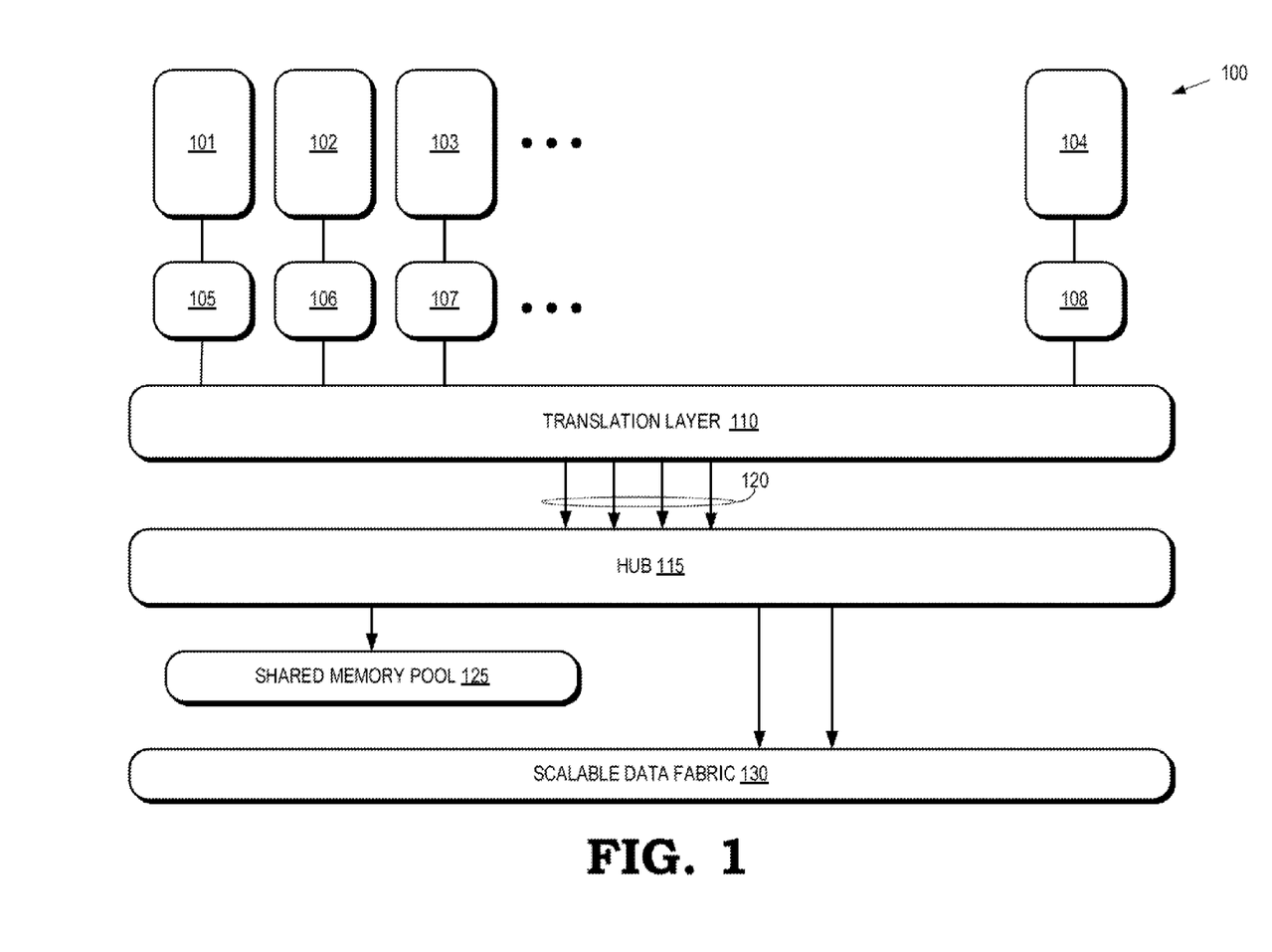
FIG. 1 is a block diagram of a first example of a processing device according to some embodiments.

FIG. 1 is a block diagram of a first example of a processing device 100 according to some embodiments. The processing device 100 includes a plurality of components 101, 102, 103, 104 (collectively referred to herein as "the components 101-104") that perform various functions. Some embodiments of the components 101-104 may include a video computation engine, a secure asset management unit, a unified video decoder, an image processing pipe, an audio processor, a display controller, one or more third party components, and the like. The number of components 101-104 is a matter of design choice and may change in response to configuration or reconfiguration of the processing device 100. The components 101-104 are connected to corresponding interfaces 105, 106, 107, 108 (collectively referred to herein as "the interfaces 105-108"). Although the components 101-104 and the interfaces 105-108 are depicted as separate entities in FIG. 1, some embodiments may implement the components 101-104 and the corresponding interfaces 105-108 in the same physical tile.

The interfaces 105-108 operate according to a parallel, point-to-point, valid/ready protocol. Some embodiments of the components 101-104 and the interfaces 105-108 may therefore operate according to AMBA protocols. For example, the interface 105 may receive a valid signal from the component 101 indicating that the component 101 has data or control information available to be transmitted over the interface 105 to a recipient. The interface 105 may also receive a ready signal from the recipient indicating that the recipient is ready to receive data or control information. There is no requirement that the valid signal or the ready signal be provided in any particular order. The interface 105 transfers the information from the component 101 to the recipient in response to the ready signal being asserted concurrently with the valid signal.

A translation layer 110 is connected to the interfaces 105-108. The translation layer 110 may transmit one or more ready signals to the interfaces 105-108 when the translation layer 110 is ready to receive data or control information from the corresponding components 101-104. Some embodiments of the translation layer 110 include buffers (not shown in FIG. 1) for receiving and storing the data or control information from corresponding components 101-104. For example, each interface 105-108 may be connected to a corresponding buffer in the translation layer 110. As long as the buffer is not full and has available entries for storing data or control information, the translation layer 110 can assert a ready signal to the corresponding interface 105-108. The interfaces 105-108 can transfer data or control information from the corresponding component 101-104 in response to the corresponding component 101-104 asserting a valid signal to the interface 105-108 concurrently with the ready signal being asserted. Once a buffer is full and does not have any available empty entries, the translation layer 110 stops asserting the ready signal so that the corresponding interface 105-108 does not transfer data from the corresponding component 101-104.

A hub 115 is connected to the translation layer 110 for receiving data or control information from one or more of the buffers in the translation layer 110. Some embodiments of the translation layer 110 may daisy-chain the buffers or arrange the buffers in a tree topology (or use a combination of daisy-chained portions and tree portions) so that the number of connections 120 between the translation layer 110 and the hub 115 is less than the number of components 101-104. The hub 115 provides connections to a shared memory pool 125 and a scalable data fabric 130, which may in turn be coupled to one or more components such as memory physical layer interfaces to memory elements such as dynamic random access memory (DRAM) memory elements or peripheral component interconnect (PCI) express interfaces. Some embodiments of the scalable data fabric 130 may include one or more buses such as a request bus or a response bus, as discussed herein. Some embodiments of the hub 115 may perform functions such as virtual memory address translation and arbitration between request to access shared resources such as the shared memory pool 125 or the scalable data fabric 130. Arbitration may be performed to satisfy latency requirements, bandwidth requirements, or quality-of-service (QoS) requirements.

Figure 2:
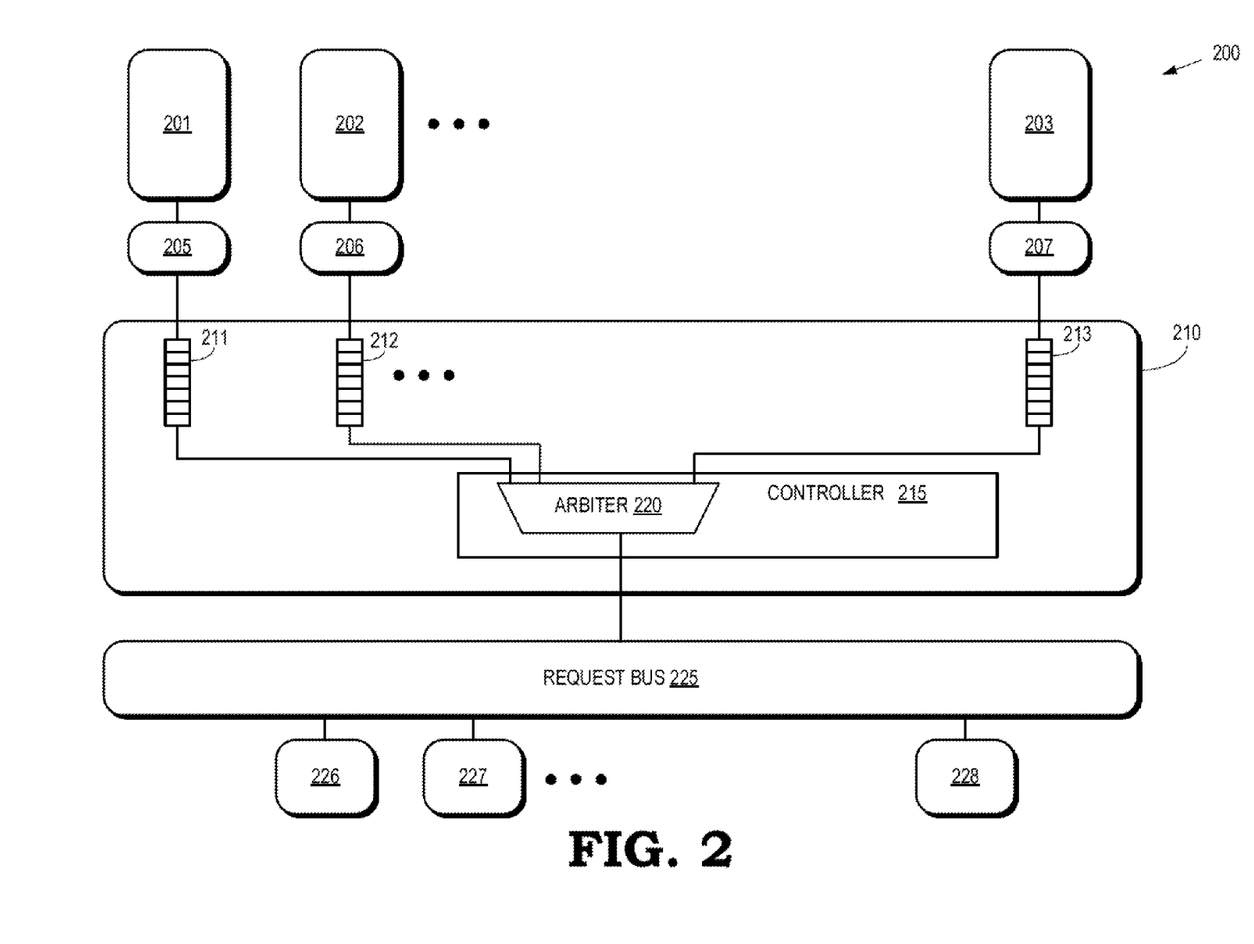
FIG. 2 is a block diagram of a second example of a processing device according to some embodiments.

FIG. 2 is a block diagram of a second example of a processing device 200 according to some embodiments. The processing device 200 includes a plurality of components 201, 202, 203 (collectively referred to herein as "the components 201-203") that perform various functions such as the functions discussed herein with regard to the components 101-104 depicted in FIG. 1. The components 201-203 are connected to corresponding interfaces 205, 206, 207 (collectively referred to herein as "the interfaces 205-207") that operate according to a parallel, point-to-point, valid/ready protocol such as the AMBA protocol.

A translation layer 210 is implemented in the processing device 200. Some embodiments of the translation layer 210 may be used to implement portions of the translation layer 110 or the hub 115 shown in FIG. 1. The translation layer 210 includes buffers 211, 212, 213 (collectively referred to herein as "the buffers 211-213"). Some embodiments of the buffers 211-213 are first-in-first-out (FIFO) buffers so that the oldest entry can be removed (or popped) from the FIFO buffer in response to providing the data or control information stored in the oldest entry to other components in the processing device 200. Each buffer 211-213 is connected to a corresponding interface 205-207 to receive data or control information and store the data or control information in an entry of the buffer 211-213. The translation layer 210 also includes a controller 215 that monitors the buffers 211-213 to determine whether the buffers 211-213 are empty, partially full, or full. As long as a buffer 211-213 is empty, the controller 215 may assert a ready signal to the corresponding interface 205-207. For example, if the buffer 211 is empty, the buffer 212 is partially full, and the buffer 213 is full, the controller 215 may assert a ready signal to the interfaces 205, 206 and may not assert a ready signal to the interface 207. The interfaces 205, 206 may therefore transfer data or control information from the components 201, 202 to the buffers 212, 213 in response to receiving a concurrent valid signal from the components 201, 202.

An arbiter 220 is used to select data or control information from entries in the buffers 211-213 for provision to a bus such as the request bus 225, which may in turn convey the data or control information to one or more components 226, 227, 228 (collectively referred to in as "the components 226-228"). Some embodiments of the buffers 211-213 provide a signal (which may be referred to as an ASK command) to the controller 215 when they have data or control information to convey over the request bus 225 to one or more of the components 226-228. The arbiter 220 may then choose between the buffers 211-213 that have asserted an ASK command to the controller 215 and provide permission to the selected buffer 211-213 to provide the data or control information to the request bus 225. Embodiments of the arbiter 220 may perform arbitration to satisfy latency requirements, bandwidth requirements, quality-of-service (QoS) requirements, DRAM efficiency requirements, PCI efficiency requirements, or any other requirements. The controller 215 may then provide a signal (which may be referred to as a GO command) to the selected buffer 211-213, which may transfer the data or control information to the request bus 225 in response to receiving the signal. Some embodiments of the controller 215 may selectively incorporate delay elements into the signal paths between the controller 215 and the buffers 211-213 to account for different propagation delays along the different signal paths.

Figure 3:
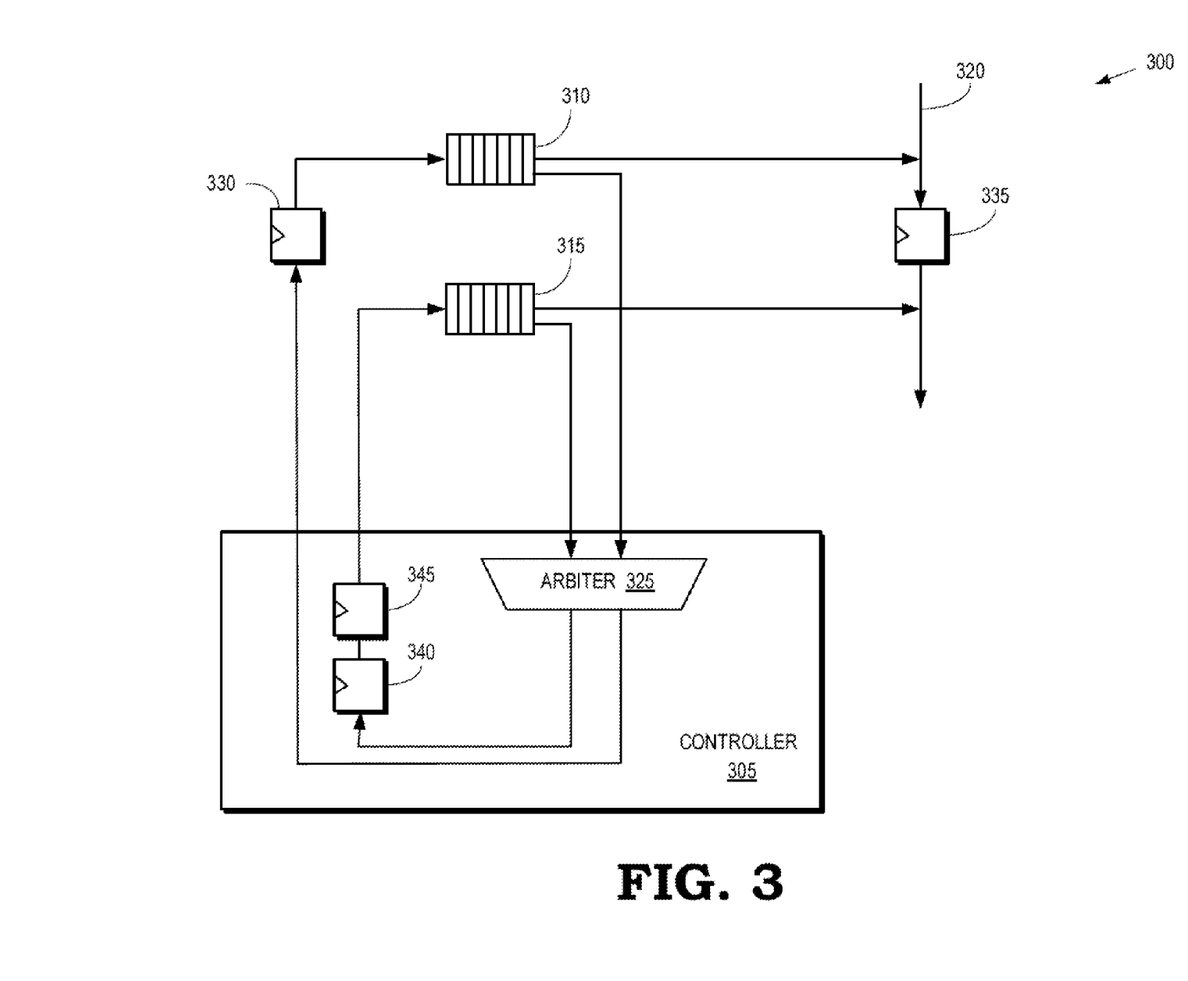
FIG. 3 is a block diagram of a portion of a translation layer according to some embodiments.

FIG. 3 is a block diagram of a portion 300 of a translation layer according to some embodiments. The portion 300 of the translation layer may be implemented in embodiments of the translation layer 110 shown in FIG. 1 or the translation layer 210 shown in FIG. 2. The portion 300 includes a controller 305 and buffers 310, 315. The buffers 310, 315 shown in FIG. 3 may be implemented as first-in-first-out (FIFO) buffers. However, some embodiments may implement other types of buffers for storing data or control information. As discussed herein, entries in the FIFO buffers 310, 315 may be used to store data or control information provided by corresponding components of a processing device that includes the translation layer. The FIFO buffers 310, 315 can provide the data or control information from an oldest entry to a component along the signal path 320 to a destination such as a bus. For example, the FIFO buffers 310, 315 can provide ASK commands to an arbiter 325 to request permission to transfer data or control information over the bus to a component of the processing device. The arbiter 325 selects one of the FIFO buffers 310, 315 based on an arbitration scheme and the controller 305 may then provide a GO command to the selected FIFO buffer 310, 315. The selected FIFO buffer 310, 315 may then transfer data or control information from its oldest entry along the signal path 320 to the bus, which may convey the data or control information to the component. The oldest entry may then be popped from the selected FIFO buffer 310, 315. If the selected FIFO buffer 310, 315 was full and popping the oldest entry makes an entry available for storing data or control information, the controller 305 may assert a ready signal associated with the selected FIFO buffer 310, 315 in response to popping the oldest entry.

The signal paths from the controller 305 to the FIFO buffers 310, 315 and over the signal path 320 to the bus or component include different relative propagation delays. For example, the signal path from the controller 305 to the FIFO buffer 310 has an additional propagation delay relative to the signal path from the controller 305 to the FIFO buffer 315. The additional relative propagation delay may be represented as a delay element 330. The signal path from the FIFO buffer 310 to the bus or component over the signal path 320 has an additional propagation delay relative to the signal path from the FIFO buffer 315 to the bus or component over the signal path 320. The additional relative propagation delay along the signal path 320 may be represented as a delay element 335.

The different propagation delays along the signal paths including the different FIFO buffers 310, 315 can lead to contention between data provided to a component by the FIFO buffers 310, 315 in response to a GO command from the controller 305. Some embodiments of the controller 305 may therefore selectively incorporate delay elements 340, 345 into signal paths associated with different FIFO buffers 310, 315. For example, the controller 305 may determine the propagation delays between issuing a GO command to the buffers 310, 315 and arrival of the data or control information at the component. The controller 305 may then selectively incorporate the delay elements 340, 345 into the signal path associated with the FIFO buffer 315 to compensate for the measured delays 330, 335 in the signal path associated with the FIFO buffer 310. The delay elements 340, 345 may be selected so that the total propagation delay between issuing a GO command to one of the FIFO buffers 310, 315 and arrival of the data or control information at a bus or component is the same for all of the FIFO buffers 310, 315 within a tolerance such as a fraction of a cycle time. Examples of techniques for measuring propagation delays along different signal paths and incorporating delay elements into the different signal paths are found in U.S. Pat. No. 8,489,752, which is incorporated herein by reference in its entirety.

Figure 4:
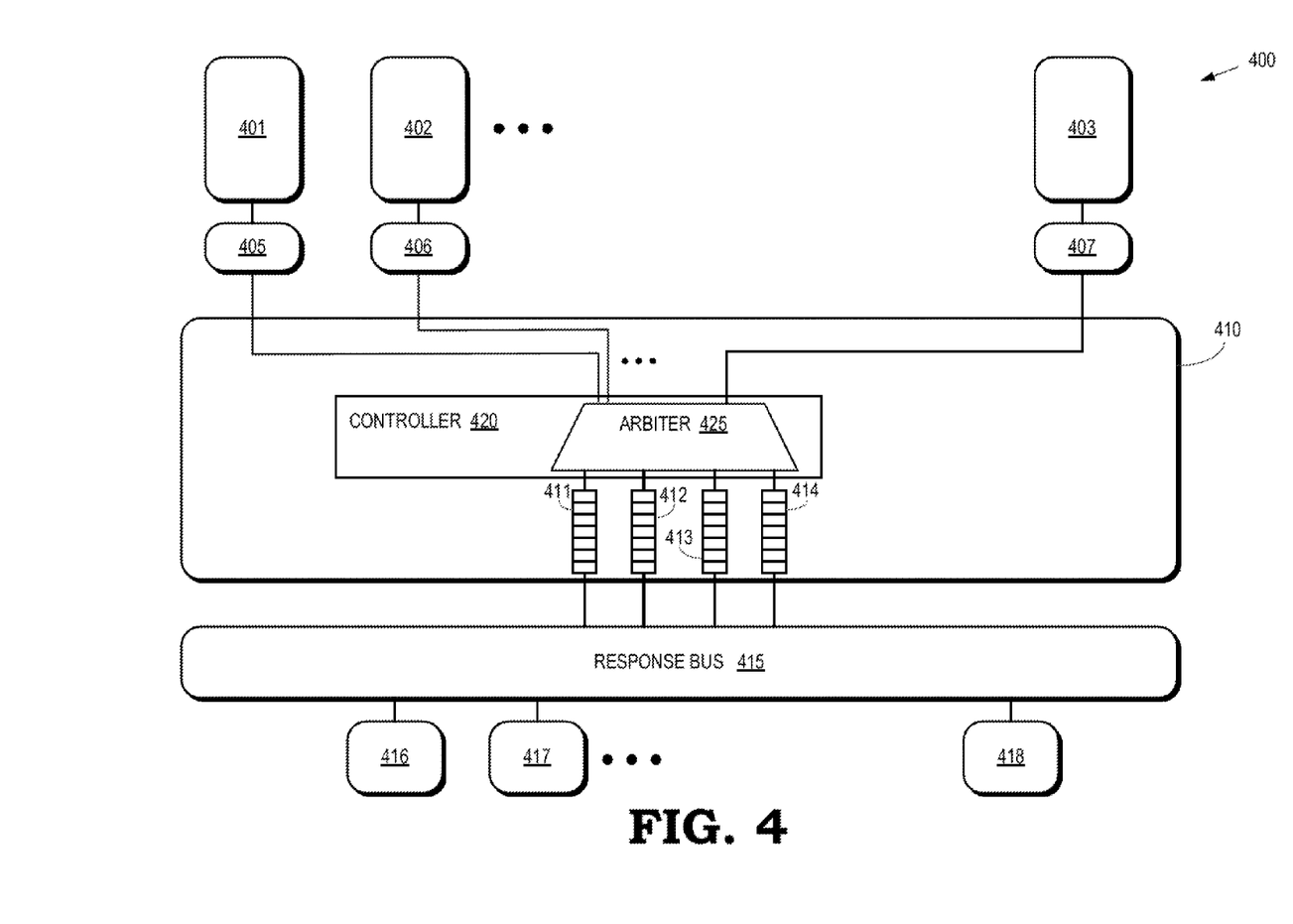
FIG. 4 is a block diagram of a third example of a processing device according to some embodiments.

FIG. 4 is a block diagram of a third example of a processing device 400 according to some embodiments. The processing device 400 includes a plurality of components 401, 402, 403 (collectively referred to herein as "the components 401-403") that perform various functions such as the functions discussed herein with regard to FIG. 1. The components 401-403 are connected to corresponding interfaces 405, 406, 407 (collectively referred to herein as "the interfaces 405-407") that operate according to a parallel, point-to-point, valid/ready protocol such as the AMBA protocol.

A translation layer 410 is implemented in the processing device 400. Some embodiments of the translation layer 410 may be used to implement portions of the translation layer 110 or the hub 115 shown in FIG. 1. The translation layer 410 includes buffers 411, 412, 413, 414 (collectively referred to herein as "the buffers 411-414"). Some embodiments of the buffers 411-414 are first-in-first-out (FIFO) buffers so that the oldest entry can be removed (or popped) from the FIFO buffer when data or control information in the oldest entry is provided to other components in the processing device 400. However, some embodiments may implement other types of buffers to store the data or control information. Each buffer 411-414 is connected to a response bus 415 to receive data or control information and store the data or control information in an entry of the buffer 411-414. The response bus 415 conveys data or control information from one or more components 416, 417, 418 (collectively referred to in as "the components 416-418") to the translation layer 410. Some embodiments of the response bus 415 are the components 416-418 operate according to a parallel, point-to-point, valid/ready protocol such as the AMBA protocol.

The translation layer 410 also includes a controller 420 that monitors the buffers 411-414 to determine whether the buffers 411-414 are empty, partially full, or full. As long as a buffer 411-414 is empty or partially full, the controller 420 may assert a ready signal to the response bus 415 or one or more of the components 416-418. For example, if the buffer 411 is empty, the buffer 412 is partially full, the buffer 413 is partially full, and the buffer 414 is full, the controller 420 may assert ready signals corresponding to the buffers 411-413 and the controller 420 may not assert a ready signal corresponding to the buffer 414. Data or control information may then be transferred from the response bus 415 or the components 416-418 to the corresponding buffers 411-413 in response to a concurrent valid signal being asserted by the response bus 415 or the components 416-418.

An arbiter 425 is used to select data or control information from entries in the buffers 411-414 for provision to one or more of the interfaces 405-407 or components 401-403. Some embodiments of the buffers 411-414 provide a signal (which may be referred to as an ASK command) to the controller 420 when they have data or control information to convey to one or more of the interfaces 405-407 or components 401-403. The arbiter 425 may then choose between the buffers 411-414 that have asserted an ASK command to the controller 420 and provide permission to the selected buffer 411-414 to provide the data or control information. Embodiments of the arbiter 425 may perform arbitration to satisfy latency requirements, bandwidth requirements, quality-of-service (QoS) requirements, or any other requirements. The controller 420 may then provide a signal (which may be referred to as a GO command) to the selected buffer 411-414, which may transfer the data or control information to one or more of the interfaces 405-407 or components 401-403 in response to receiving the signal.

Some embodiments of the controller 420 may selectively incorporate delay elements into the signal paths between the controller 420 and the buffers 411-414 to account for different propagation delays along the different signal paths. Some embodiments of the controller 420 may also use a valid/ready protocol to determine when to permit transfer of data from the selected buffer 411-414 to one or more of the interfaces 405-407 or components 401-403. For example, the controller 420 may assert a valid signal to one or more of the interfaces 405-407 when the data or control information is available in the selected buffer 411-414. The data or control information may then be transferred from the selected buffer 411-414 to one or more of the interfaces 405-407 or components 401-403 in response to a ready signal being concurrently asserted by one or more of the interfaces 405-407 or components 401-403. Consequently, the controller 420 may send a GO command to the selected buffer 411-414 in response to the concurrent assertion of a valid signal by the controller 420 and a ready signal by one or more of the interfaces 405-407.

Figure 5:
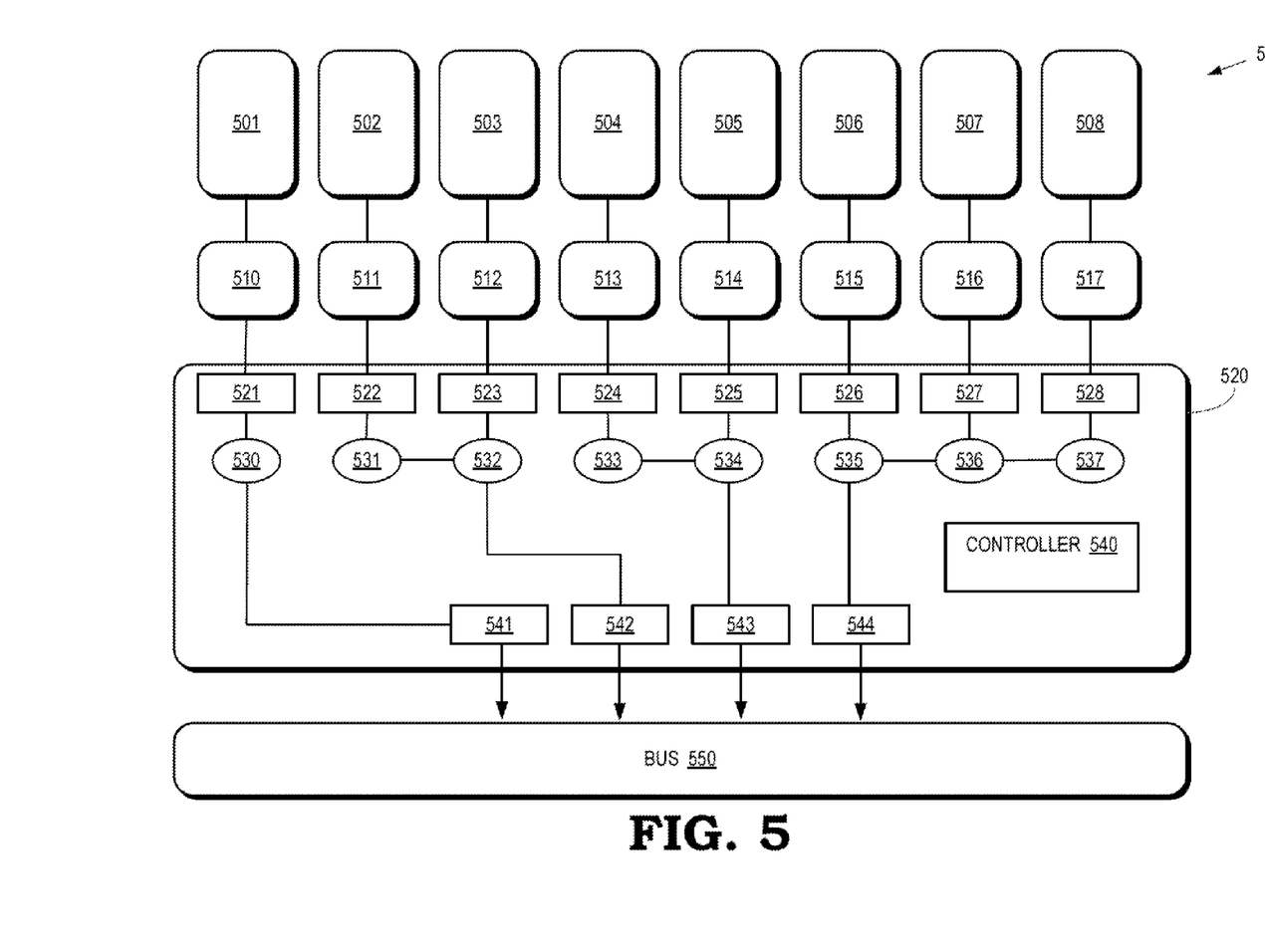
FIG. 5 is a block diagram of a fourth example of a processing device according to some embodiments.

FIG. 5 is a block diagram of a fourth example of a processing device 500 according to some embodiments. The processing device 500 includes a plurality of components 501, 502, 503, 504, 505, 506, 507, 508 (collectively referred to herein as "the components 501-508") that perform various functions such as the functions discussed herein with regard to FIG. 1. The components 501-508 are connected to corresponding interfaces 510, 511, 512, 513, 514, 515, 516, 517 (collectively referred to herein as "the interfaces 510-517") that operate according to a parallel, point-to-point, valid/ready protocol such as the AMBA protocol.

A translation layer 520 is implemented in the processing device 500. Some embodiments of the translation layer 520 may be used (in some cases in combination with aspects of the translation layer 210 shown in FIG. 2, the portion 300 of the translation layer shown in FIG. 3, or the translation layer 410 shown in FIG. 3) to implement portions of the translation layer 110 or the hub 115 shown in FIG. 1. The translation layer 520 includes repeaters 521, 522, 523, 524, 525, 526, 527, 528 (collectively referred to herein as "the repeaters 521-528") for repeating or amplifying signals provided to corresponding nodes 530, 531, 532, 533, 534, 535, 536, 537 (collectively referred to herein as "the nodes 530-537"). Some embodiments of the nodes 530-537 include buffers such as the buffers 211-213 shown in FIG. 2.

The translation layer 520 includes a controller 540 that monitors the nodes 530-537 to determine whether the corresponding buffers are empty, partially full, or full. As long as a buffer in one of the nodes 530-537 is empty or partially full, the controller 540 may assert a ready signal to the corresponding interface 510-517, which may transfer data or control information from the components 501-508 to the nodes 530-537 via the repeaters 521-528 in response to receiving a concurrent valid signal from the components 501-508.

Subsets of the nodes 530-537 may be daisy-chained together and the outputs of the daisy-chain connected to corresponding repeaters 541, 542, 543, 544 (collectively referred to herein as "the repeaters 541-544"). For example, the nodes 531, 532 may be daisy-chained together and connected to the repeater 542, the nodes 533, 534 may be daisy-chained together and connected to the repeater 543, and the nodes 535, 536, 537 may be daisy-chained together and connected to the repeater 544. The number of nodes that may be daisy-chained together is a matter of design choice. The controller 540 or other arbiter (not shown in FIG. 5) may arbitrate between nodes in a daisy chain to select which node is to provide data or control information to a corresponding repeater 541-544 and onto a bus 550. Arbitration may be performed between nodes that have signaled that they have data or control information to transfer over the bus 550 (e.g., using an ASK command). The controller 540 may signal the selection to the corresponding node using a GO command.

Figure 6:
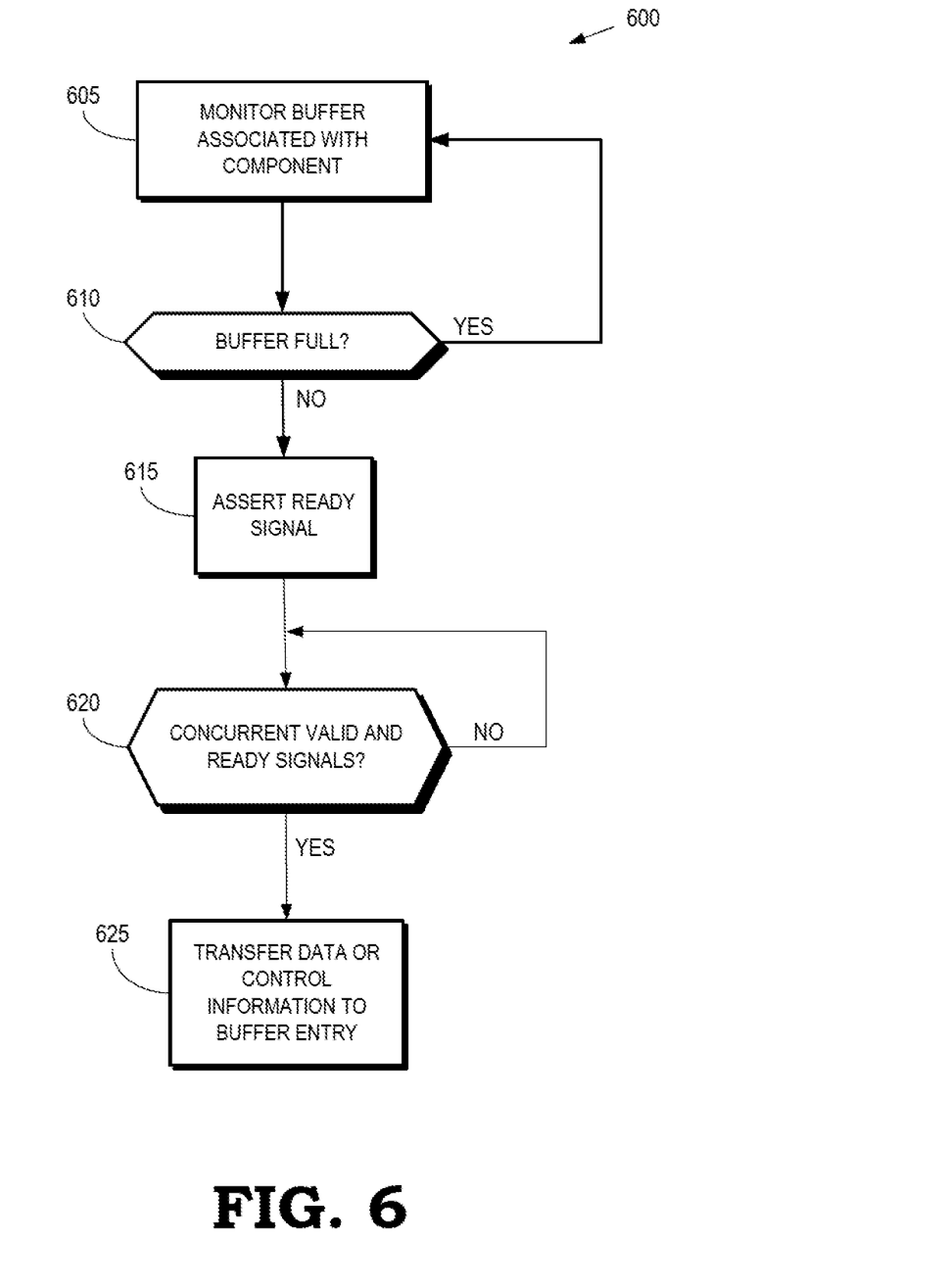
FIG. 6 is a flow diagram of a method of transferring data or control information from a component to a buffer entry using a valid/ready protocol according to some embodiments.

FIG. 6 is a flow diagram of a method 600 of transferring data or control information from the components to a buffer entry using a valid/ready protocol according to some embodiments. The method 600 may be implemented in a controller such as the controller 215 shown in FIG. 2, the controller 305 shown in FIG. 3, the controller 420 shown in FIG. 4, or the controller 540 shown in FIG. 5. At block 605, the controller monitors a buffer associated with a component in a processing device. At block 610, the controller determines whether the buffer is full. As long as the buffer is full and unable to add any new entries to store data or control information, the controller continues to monitor the buffer at block 605 and does not assert a ready signal. If the buffer is empty or less than full, e.g., if the buffer has at least one available entry for data or control information, the controller asserts a ready signal at block 615.

At block 620, it is determined whether the component has asserted a valid signal concurrently with the ready signal asserted by the controller. If not, no data or control information is transferred from the component to the buffer. If the valid signal and the ready signal are asserted concurrently, data or control information is transferred from the component to a buffer entry in the buffer at block 625.

Figure 7:
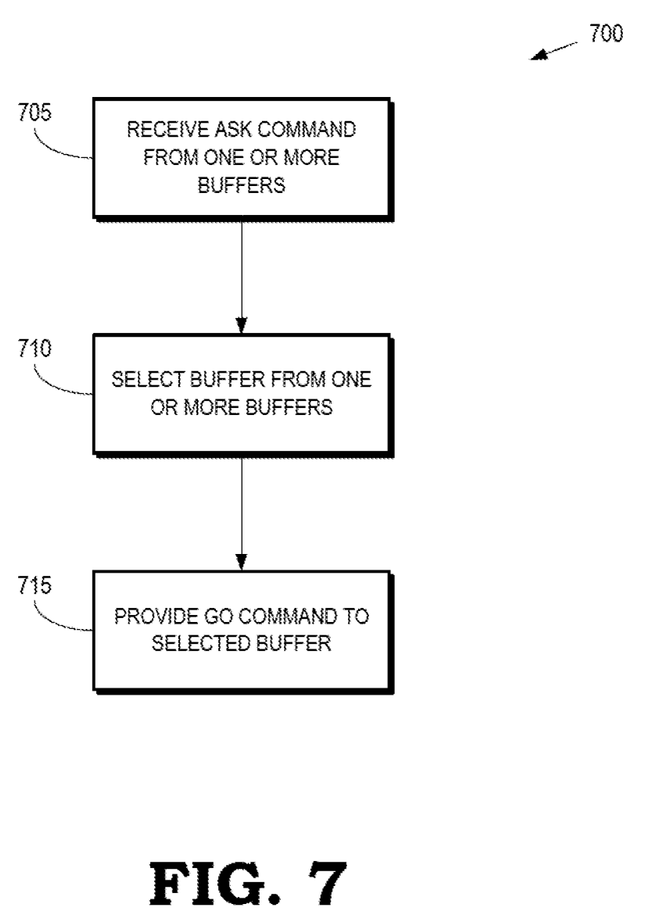
FIG. 7 is a flow diagram of a method for providing data from a buffer using an ASK/GO protocol according to some embodiments.

FIG. 7 is a flow diagram of a method 700 for providing data from a buffer using an ASK/GO protocol according to some embodiments. The method 700 may be implemented in a controller such as the controller 215 shown in FIG. 2, the controller 305 shown in FIG. 3, the controller 420 shown in FIG. 4, or the controller 540 shown in FIG. 5. At block 705, the controller receives an ASK command from one or more buffers indicating that the buffers have data or control information in at least one entry that is available for transfer to another component via a bus. At block 710, the controller selects one of the buffers that has asserted the ASK command. For example, an arbiter may be used to arbitrate between the different buffers according to an arbitration scheme. At block 715, the controller provides a GO command to the selected buffer to signal the buffer that they can transfer data or control information from an entry to the other component via the bus.

In some embodiments, the apparatus and techniques described above are implemented in a system comprising one or more integrated circuit (IC) devices (also referred to as integrated circuit packages or microchips), such as the translation layer described above with reference to FIGS. 1-7. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 8:
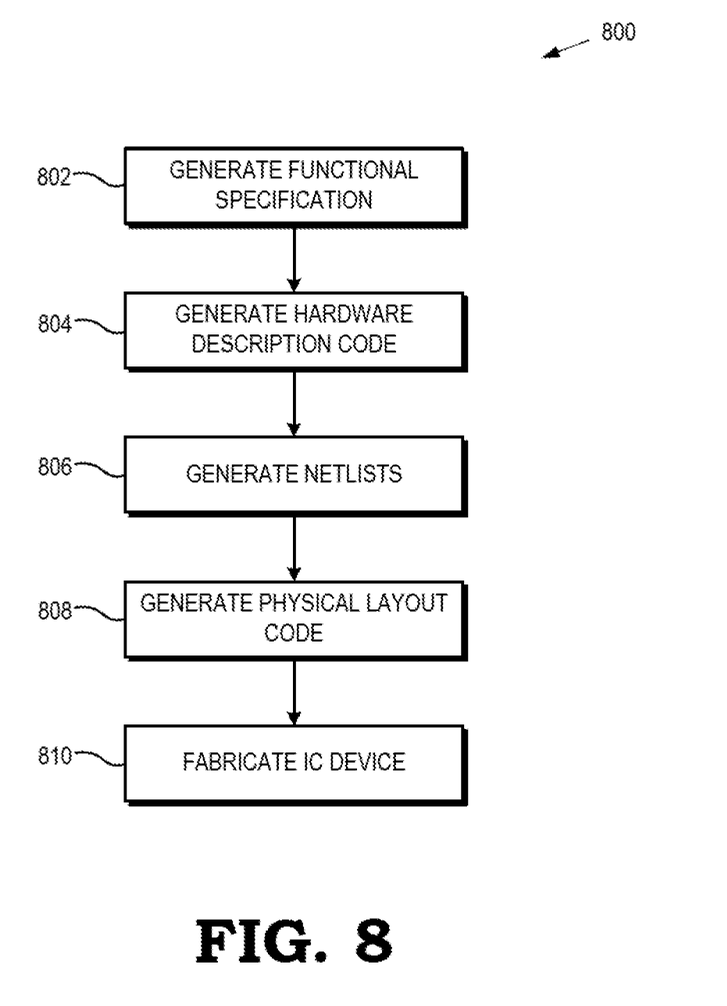
FIG. 8 is a flow diagram illustrating a method for designing and fabricating an integrated circuit device implementing at least a portion of a component of a processing system in accordance with some embodiments.

FIG. 8 is a flow diagram illustrating an example method 800 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 802 a functional specification for the IC device is generated. The functional specification (often referred to as a micro architecture specification (MAS)) may be represented by any of a variety of programming languages or modeling languages, including C, C++, SystemC, Simulink, or MATLAB.

At block 804, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 806 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 808, one or more EDA tools use the netlists produced at block 806 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 810, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a plurality of components;
a bus; and
a translation layer between the plurality of components and the bus, wherein the translation layer comprises:
a plurality of first buffers; and
a controller to assert at least one ready signal corresponding to at least one of the plurality of first buffers in response to the at least one of the plurality of first buffers being less than full, wherein the at least one of the plurality of first buffers receives data or control information from at least one corresponding component in response to the ready signal being asserted concurrently with at least one valid signal asserted by the at least one corresponding component.

2. The apparatus of claim 1, further comprising:
an arbiter to select one of the plurality of first buffers to provide data or control information to the bus.

3. The apparatus of claim 2, wherein the plurality of first buffers are a plurality of first-in-first-out (FIFO) buffers, and wherein the controller is to issue a command to pop an oldest entry from one of the plurality of FIFO buffers selected by the arbiter and provide the data or control information from the oldest entry to the bus.

4. The apparatus of claim 3, wherein the controller asserts the ready signal in response to popping the oldest entry from a full one of the plurality of FIFO buffers.

5. The apparatus of claim 1, wherein the controller determines a plurality of time intervals to propagate the ready signal from the controller to the plurality of first buffers and to provide the data or control information from the plurality of first buffers to the bus.

6. The apparatus of claim 5, wherein the controller selectively incorporates delay elements into a plurality of signaling paths from the controller to the plurality of first buffers such that the plurality of time intervals plus the corresponding delay elements is the same for the plurality of signaling paths within a predetermined tolerance.

7. The apparatus of claim 1, further comprising:
a plurality of second buffers, wherein the controller is to assert at least one ready signal corresponding to at least one of the plurality of second buffers in response to the at least one of the plurality of second buffers being less than full, wherein the at least one of the plurality of second buffers receives data or control information from the bus in response to the ready signal being asserted concurrently with at least one valid signal asserted by the bus.

8. A method comprising:
asserting, at a translation layer between a plurality of components and a bus, at least one ready signal corresponding to at least one of a plurality of first buffers in response to the at least one of the plurality of first buffers being less than full; and
receiving, by at least one of the plurality of first buffers, data or control information from at least one corresponding component of the plurality of components in response to the ready signal being asserted concurrently with at least one valid signal asserted by the at least one corresponding component.

9. The method of claim 8 further comprising:
selecting one of the plurality of first buffers to provide data or control information to a bus.

10. The method of claim 9, wherein the plurality of first buffers are a plurality of first-in-first-out (FIFO) buffers, and further comprising:
issuing a command to pop an oldest entry from the selected one of the plurality of FIFO buffers and provide the data or control information from the oldest entry to the bus.

11. The method of claim 10, further comprising:
asserting the ready signal in response to popping the oldest entry from a full one of the plurality of FIFO buffers.

12. The method of claim 10, further comprising:
determining a plurality of time intervals to propagate the command from a controller to the plurality of FIFO buffers and to provide the data or control information from the plurality of FIFO buffers to the bus.

13. The method of claim 12, further comprising:
selectively incorporating delay elements into a plurality of signaling paths from the controller to the plurality of FIFO buffers such that the plurality of time intervals plus the corresponding delay elements is the same for the plurality of signaling paths within a predetermined tolerance.

14. The method of claim 8, further comprising:
asserting at least one ready signal corresponding to at least one of a plurality of second buffers in response to the at least one of the plurality of second buffers being less than full; and
receiving, by at least one of the plurality of second buffers, data or control information from the bus in response to the ready signal being asserted concurrently with at least one valid signal asserted by the bus.

15. An apparatus comprising:
a plurality of interfaces to a plurality of components;
a bus; and
a translation layer intermediate to the bus and the plurality of interfaces, wherein the translation layer comprises a plurality of first buffers and the translation layer is to:
assert, to at least one of the plurality of interfaces, at least one ready signal corresponding to at least one of the plurality of first buffers in response to the at least one of the plurality of first buffers being less than full; and
store, in the at least one of the plurality of first buffers, data or control information from the at least one of the plurality of interfaces in response to the ready signal being asserted concurrently with at least one valid signal asserted to the at least one of the plurality of interfaces by at least one corresponding component.

16. The apparatus of claim 15, further comprising:
an arbiter to select one of the plurality of first buffers to provide data or control information to a bus.

17. The apparatus of claim 16, wherein the plurality of first buffers are a plurality of first-in-first-out (FIFO) buffers, and further comprising a controller to issue a command to pop an oldest entry from the selected one of the FIFO buffers and provide the data or control information from the oldest entry to the bus.

18. The apparatus of claim 17, wherein the translation layer is to assert the ready signal in response to popping the oldest entry from a full one of the plurality of FIFO buffers.

19. The apparatus of claim 17, wherein the controller is to determine a plurality of time intervals to propagate the command from the controller to the plurality of FIFO buffers and to provide the data or control information from the plurality of FIFO buffers to the bus.

20. The apparatus of claim 19, wherein the controller is to selectively incorporate delay elements into a plurality of signaling paths from the controller to the plurality of FIFO buffers such that the plurality of time intervals plus the corresponding delay elements is the same for the plurality of signaling paths within a predetermined tolerance.

\* \* \* \* \*